United States Patent [19]

Wildförster

[11] 4,180,258
[45] Dec. 25, 1979

[54] APPARATUS FOR TRANSPORTING AND DEPOSITING PANELS

[75] Inventor: Emil Wildförster, Weilheim, Fed. Rep. of Germany

[73] Assignee: Zarges Leichtbau GmbH, Weilheim, Fed. Rep. of Germany

[21] Appl. No.: 902,037

[22] Filed: May 2, 1978

[30] Foreign Application Priority Data

May 4, 1977 [DE] Fed. Rep. of Germany ....... 2720030

[51] Int. Cl.² .............................................. B65H 29/32
[52] U.S. Cl. ..................................... 271/196; 414/73; 414/752
[58] Field of Search ............... 271/196, 197, 194, 195, 271/276, 96, 95, 94, 108; 198/689; 414/73, 72, 752

[56] References Cited

U.S. PATENT DOCUMENTS

| 1,634,196 | 6/1927 | Jones | 271/196 |
|---|---|---|---|
| 1,957,621 | 5/1934 | Styron | 271/196 |
| 3,908,835 | 9/1975 | Lubas | 271/196 X |

Primary Examiner—Bruce H. Stoner, Jr.
Attorney, Agent, or Firm—Dressler, Goldsmith, Clement, Gordon & Shore, Ltd.

[57] ABSTRACT

An improvement in an apparatus for transporting and depositing panels with smooth surfaces, comprising a conveyor having substantially horizontally oriented endless belt. A plurality of suction holders carried by said belt means with a suction cut and a venting valve which is opened for depositing said panel at a depositing position. Each of said suction cups is displaceable parallel with the transport direction in relation to the zone of attachment of its body to said belt by a stop provided at said depositing position in the transport path of said panels, which stop on arrival of one of said panels displaces all those adjacent suction cups holding said panel contrarily to said transport direction, which displacement opens the venting valves of all those adjacent individual suction holders holding said panel.

11 Claims, 11 Drawing Figures

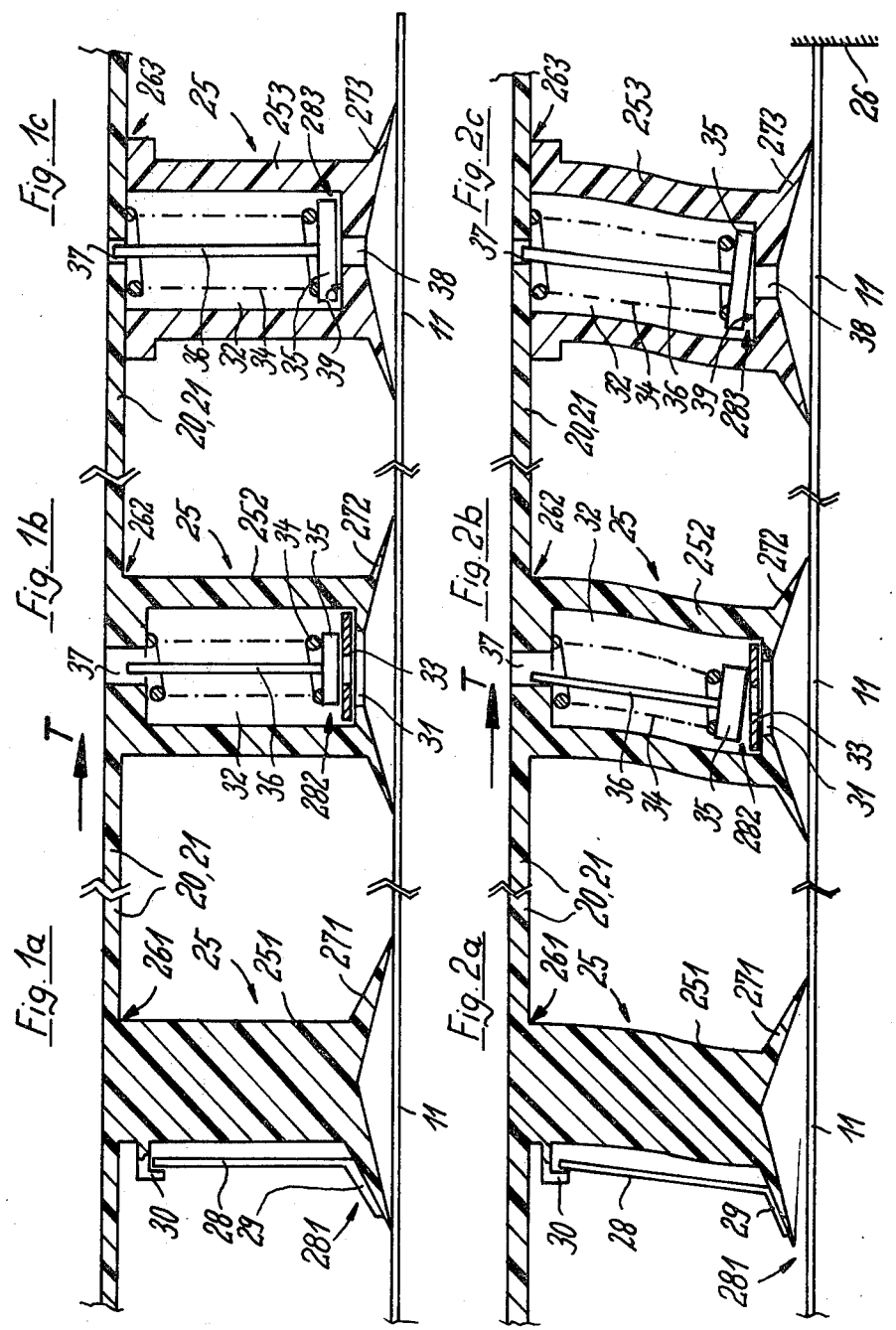

APPARATUS FOR TRANSPORTING AND DEPOSITING PANELS

FIELD OF THE INVENTION

The invention relates to an apparatus for transporting and depositing panels with smooth surfaces, comprising a conveyor having substantially horizontally oriented endless belt means, said belt means being guided over horizontal reversing rollers, a plurality of suction holding means carried by said belt means, some adjacent suction holding means being pressed against one of said surfaces of one of said panels to adhere firmly by suction thereto in the picking up of said panel.

DISCUSSION OF THE PRIOR ART

In a known apparatus for conveying and depositing panels, cross-members are arranged parallel with one another transversely of the transport direction on two endless chains, on which cross-members beams are displaceably mounted against the action of tension springs, which beams extend parallel with the cross-members and each carry several suction holders lying one beside the other. In the body of each of said suction holders there is arranged a venting valve the valve disc of which possesses an operating journal which is extending from the body of said suction holder. Between each cross-member and the associated beam there is a control rod which is displaceable under the action of a setting member parallel with the cross-member and the beam and in displacement controls the actuating journals and thus the venting valves. The setting member is arranged parallel with the transport path in the region of the depositing position and is of such long dimensions that it can simultaneously actuate several control rods. Ordinarily a panel is secured to at least two rows of suction holders. Accordingly at the depositing place the setting member displaces at least two control rods which then open all venting valves on the associated beam. The panel comes free from the suction cups and falls, if appropriate, upon a stack of already deposited panels. Apart from the expenditure for construction and control techniques, the number of individual elements is considerable so that the device not only brings about considerable production costs but also is expensive in overhaul and maintenance. The numerous individual elements form causes of troubles which each necessitate halting of the entire apparatus. The stoppage times are therefore considerable. A further disadvantage consists in that in the formation of a stack it is not possible to deposit the panels so as to be oriented exactly one above the other, since each individual panel in the release phase possesses an unbraked inertia component in the transport direction and above the uppermost panel an air cushion—even though slight—must be eliminated.

It is an object of this invention to reduce the construction expenditure for such a transport device and, despite simplification of the entire device, to achieve exact orientation of the deposited panels on a stack.

SUMMARY OF THE INVENTION

In accordance with the foregoing this invention broadly contemplates an apparatus for transporting and depositing panels with smooth and delicate surfaces, which apparatus provides an improved holding and depositing without damage of the delicate surfaces of the panels and undue expenditure of construction. Hence, the present invention contemplates an improvement in an apparatus for transporting and depositing panels with smooth surfaces, comprising a conveyor having substantially horizontally oriented endless belt means, said belt means being guided over horizontal reversing rollers, a plurality of suction holding means carried by said belt means, each of said suction holding means having a body attached to said belt means and being provided with a suction cup being arranged at the free end of said body, some adjacent suction holding means being pressed against one of said surfaces of one of said panels to adhere firmly by suction thereto in the picking up of said panel, each of said suction holding means being further provided with a venting valve which is opened for depositing said panel at a depositing position, each of said suction cups being displaceable parallel with the transport direction in relation to the zone of attachment of its body to said belt means, and stop means being provided at said depositing position in the transport path of said panels, which stop means on arrival of one of said panels displaces all those adjacent suction cups holding said panel contrarily to said transport direction, which displacement opens the venting valves of all those adjacent individual suction holding means holding said panel.

Thus, the advantage is achieved that expensive control and setting members are eliminated. The panel is brought to a halt on reaching the depositing place, before it is released from the suction cups. The stop means imparts exact orientation to the panel in the transport direction in relation to the panels already situated on the stack. Orientation transversely of the transport direction is already ensured by the processing machine, such as a shearing apparatus, since the suction holding means maintain this orientation even during the transport of the panels. The controlling of the venting valves is effected exclusively through the conveyed material itself, namely the panels, which displace only the adjacent suction holding means which specifically hold the panels. In this way not only are the bodies of the suction holding means and the venting valves less stressed, but it becomes superfluous to select control rods which would each have to control all the venting valves, and to provide setting members which will have to be designed for the largest possible panel area. On the other hand in the apparatus in accordance with the present invention use is made of the fact that there is always a relationship between the panel area and the panel thickness, so that the rigidity of the panel is sufficient for use to be made of the forces existing by reason of the movement of the belt in relation to the fixed stop, for the displacement of the suction holding means and actuation of the venting valves.

The endless belt means can be a wide strap, can consist of at least two endless chains arranged parallel, or can be formed in another way. If a strap is provided the suction holding means or at least their bodies can be moulded directly thereon, natural or synthetic rubber can be used and the strap is expediently reinforced by a fabric insert. Soft PVC or polyethylene are also suitable. If existing strap material is used the individually manufactured suction holding means can be stuck, vulcanised, screwed or otherwise fastened thereto.

BRIEF DESCRIPTION OF THE DRAWING

Referring to the accompanying drawings showing some preferred embodiments of the invention:

FIG. 1a to 1c show three different embodiments of suction holders with deformable bodies in the transport position.

FIG. 2a to 2c show the corresponding suction holders according to FIG. 1 in the depositing position.

DESCRIPTION OF SPECIFIC EMBODIMENTS

Figure 3:
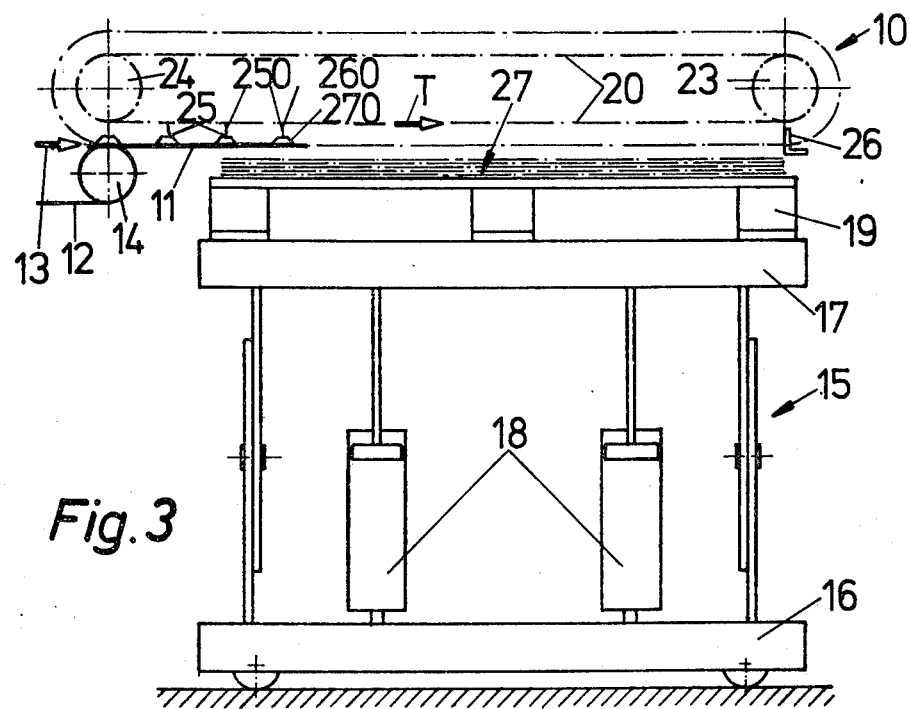
FIG. 3 shows the apparatus diagrammatically with the depositing place.

FIG. 3 shows diagrammatically an apparatus 10 for the transport and depositing of panels 11 with smooth surfaces, such as sheets of aluminium or other metals, rigid synthetic plastics panels, smooth wooden or veneer panels, asbestos-cement panels or the like. In the embodiment as illustrated, aluminium sheets 11 cut to shape are successively conducted from a shearing apparatus on a conveyor belt 12 in accordance with the arrow 13. In the region of the reversing roller 14 of the conveyor belt 12 the sheets 11 are taken over by the apparatus 10.

The apparatus 10 has a machine frame (not shown) which is associated with the delivery end of the shearing apparatus and a stacking device 15 for the sheets 11, and can be connected with one of these. The stacking device 15 consists, in the embodiment as shown in FIG. 3, of a mobile basic frame 16 with a vertically displaceable table 17 which is raisable and lowerable by lifting cylinders 18. A pallet 19 can be set upon the table 17. The stack of sheets is formed on the pallet 19, the table 17 and the pallet 19 being lowered in dependence upon the growth of the stack of metal sheets. Such stacking devices are known and render it possible, in adaptation to the high working speeds of such sheet metal shearing apparatuses, to stack the sheets 11 correspondingly quickly.

The apparatus 10 comprises essentially an conveyor the endless belt 20 of which can be formed as strap 21, chain 22 or the like. The belt 20 is directed substantially horizontally and runs over horizontal reversing rollers 23 and 24, the reversing roller 24 being arranged approximately above the reversing roller 14 of the conveyor belt 12. The belt 20 circulates in the transport direction T. A plurality of suction holders 25 are arranged side by side and one behind the other in linear rows and columns on the belt 20, the rows of the suction holders 25 extending parallel with the axes of the reversing rollers 23 and 24.

The suction holders 25 consist essentially of a body 250 with a zone 260 of attachment to the belt 20 and a suction cup 270 at the free end of the body 250 opposite to the attachment zone 260.

For the formation of a stack of metal sheets 11 lying exactly one above the other the apparatus 10 comprises a stop 26 which reaches at the end of the depositing position 27 into the transport path of the suction cups 270 or at least of the panels 11. The length of the transport path and the position of the stack can be selected as desired by displacement of the stop 26 in or contrarily to the transport direction T. The stop 26 is expediently made in the form of a comb with individual teeth reaching between the columns of suction cups 270. In this way the stop 26 reliably acts upon the panels 11 and the latter are oriented precisely in relation to the stack of panels already present at 27.

FIG. 1a to 1c show three different embodiments for the suction holders 25. On each belt 20 all the suction holders 25 are identical. In the embodiments according to FIG. 1a to 1c, deformable bodies 251, 252, 253 are provided. The body 251 according to FIG. 1a is a solid cylinder which is attached at 261 integrally to the strap 21. On the free end of the body 251 there is a suction cup 271. A venting valve 281 has an actuating journal 28 which is secured to the outer shell of the suction cup 271. The actuating journal 28 can merge into a rib 29 which extends parallel with the outer shell of the suction cup 271 and is firmly connected therewith. The journal 28 and the rib 29 form an integral rigid element which lies behind the body 251—seen in the direction of transport T—the journal 28 extending parallel with the body 251. Beneath the attachment zone 261 a stop 30 likewise of rigid material is secured to the body 251 or directly to the strap 21. When the forward edge of the metal sheet 11 places itself against the stop 26, all the bodies 251 holding the sheet 11 are deformed according to FIG. 2a, the stop 30 pivots the actuating journal 28, the rib 29 lifts the shell of the suction cup 271 and the internal space of the suction cup 271 is ventilated. While the strap 21 continues its movement uninterruptedly the sheet panel 11 which has come to a halt drops exactly vertically downwards on to the stack 27.

In the embodiment according to FIG. 1b the body 252 of the suction holder 25 is likewise integrally attached at 262 to the strap 21. The body 252 is of a hollow cylindrical form and carries a suction cup 272 at its free end. The suction cup 272 has a large opening 31 which is in communication with an internal space 32 of the body 252. The opening 31 is formed for the introduction of a seating ring 33, a compression spring 34 and a valve disc 35. On the back of the valve disc 35 a rigid pin 36 is secured which extends into an aperture 37 which is formed in the attachment zone 262 and can penetrate the strap 21 completely. Under the action of the compression spring 34 the valve disc 35 places itself against the seating ring 33 and keeps the venting valve 282 closed. At the same time the compression spring 34 holds the seating ring 33 in position. This ring can be pushed into the internal space 32 by deformation of the opening 31. If the body 252 is deformed in accordance with FIG. 2b the venting valve 282 is opened due to the fact that the pin 36 places the valve disc 35 obliquely and thus lifts it away from the seating ring 33. Thus air is admitted to the internal space of the suction cup 272 and the sheet metal panel 11 drops vertically downwards on to the stack 27. The air equalisation with the internal space 32 is per se adequate. However, it expediently also takes place through the aperture 37.

In the example according to FIG. 1c the body 253 of the suction holder 25 is stuck to the strap 21 at 263. The suction cup 273 is formed on the free end of the body 253 and has a relatively small venting opening 38. Above the venting opening there is formed a seat 39 for a valve disc 35. The seat 39 together with the valve disc 35 forms a venting valve 283. The venting valve 283 is subject to the action of a compression spring 34 which like the disc 35 with the actuating pin 36 is situated within the internal space 32 of the body 253. In the strap 21 an aperture 37 is provided in which the pin 36 is guided. The aperture 37 can serve at the same time as pressure equalisation opening. For assembly the valve disc 35 and the spring 34 are inserted into the internal space 32 and the arrangement is then stuck to the strap 21 at 263. For this purpose the strap 21 and the body 253 can consist of suitable material pairings of synthetic plastics material or rubber. If the body 253 is deformed in conformity with FIG. 2c, that is the suction cup 273 with the sheet metal panel 11 comes to abut on the stop 26, the pin 36 places the valve disc 35 obliquely, the disc is lifted away from the seat 39 and thus the valve 283 is opened. Air is admitted to the internal space of the suction cup 273 through the aperture 37 and the opening 38 and the sheet metal panel 11 drops vertically down on to the stack 27.

Figure 4:
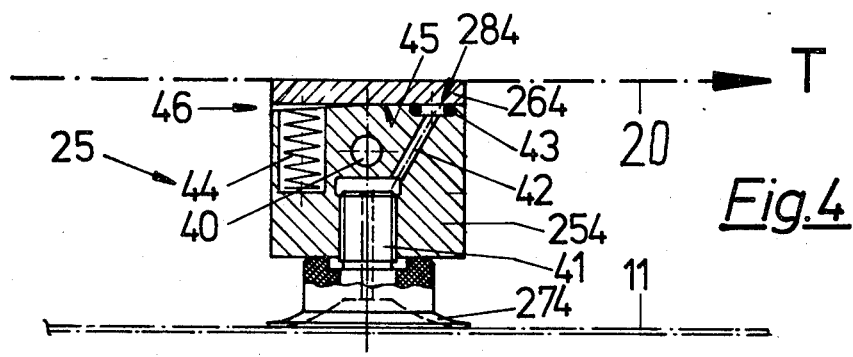
FIG. 4 shows a further embodiment of a suction holder in the transport position.
Figure 5:
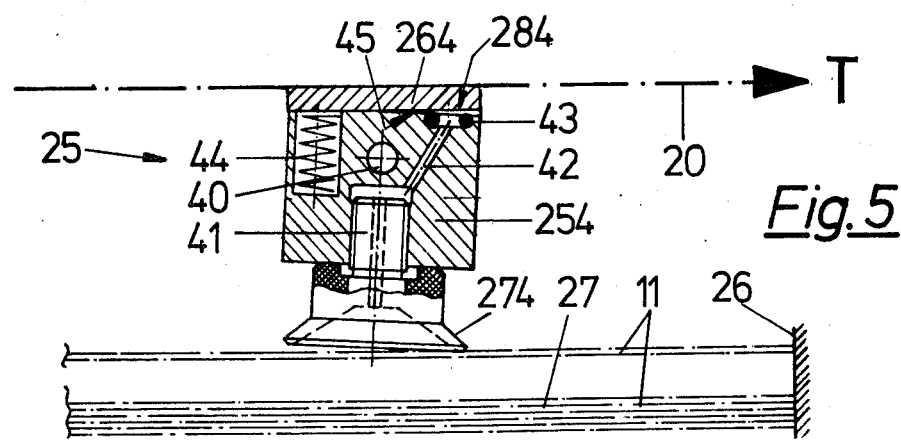
FIG. 5 shows the suction holder according to FIG. 4 in the depositing position.

In the embodiment according to FIGS. 4 and 5 the body 254 of the suction holder 25 consists of a solid block of metal or hard synthetic plastics materials. The body 254 is pivotable transversely of the transport direction T about a spindle 40. The spindle 40 is arranged on the flanges (not shown) of a bracket 264 which is secured to the belt 20. The belt 20 can be a strap 21 but is expediently an open-link chain 22 somewhat according to FIG. 6. On the free side of the body 254 opposite to the bracket 264 a suction cup 274 is attached which consists of soft synthetic plastics material like the suction cups 271 to 273. The suction cup 274 can be provided with an attachment nipple 41 which is screwed into a bore of the body 254. From the attachment nipple 41 a bore 42 leads to a venting valve 284. The venting valve 284 comprises an elastically deformable O-ring 43 which is held under the action of a spring 44 in abutment on a surface 45 which is formed on the bracket 264 and is machined completely flat and thus suitable as valve seat. The compression spring 44 is arranged on the side of the spindle 40 opposite to the venting valve 284 and endeavours constantly to keep the venting valve 284 closed. On the other hand the body 254 is flattened off obliquely in the region of the compression spring 44 so that a wedge 46 forms between the surface of the body 254 and the bracket 264. When the sheet metal panel 11 is moved in the transport direction T by the belt 20 and in this movement comes to abut on the stop 26, the panel 11 is halted and the body 254 is pivoted by the suction cup 274 according to FIG. 5. The wedge 46 closes while the venting valve 284 opens and air is admitted to the internal space of the suction cup 274. According to FIG. 5 the suction cup 274 lifts away from the panel 11 and the panel 11 drops vertically down on to the stack 27 while the belt 20 continues its movement uninterruptedly in the direction of the arrow T.

Figure 6:
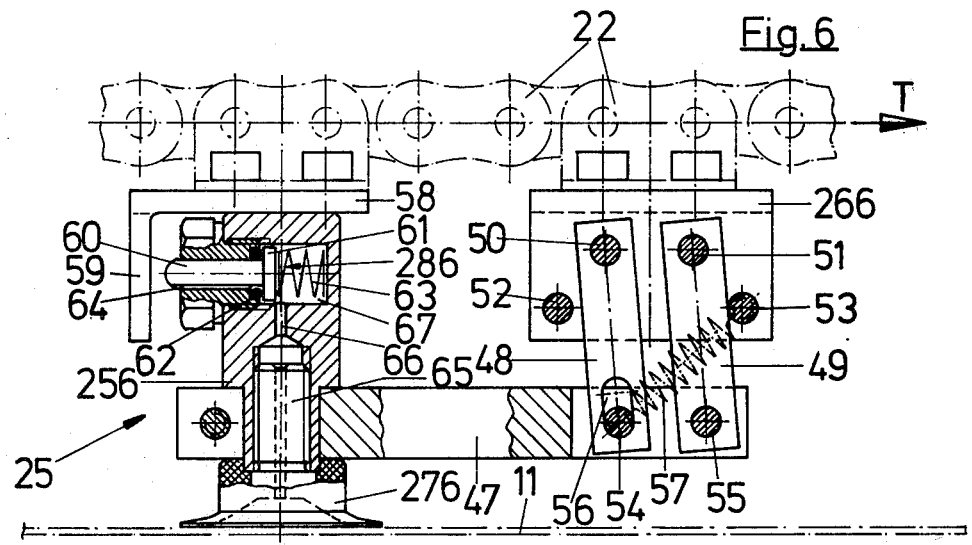
FIG. 6 shows a further embodiment of a suction holder in the transport position.

In the embodiment according to FIG. 6 the belt 20 is formed as an open link chain 22 and the body 256 of the suction holder 25 consists of a solid metal block. The body 256 is firmly connected with an arm 47 which is mounted for displacement parallel with an attachment element 266 on this element by means of a double link 48, 49. The attachment element 266 is secured to a link of the chain 22. The attachment element 266 also has pivot bearings 50, 51, and stops 52, 53 for the links 48, 49 which are attached at their free ends by means of spindles 54, 55 to the arm 47. In order to achieve a certain adaptability of the suction holder in accordance with FIGS. 6 and 7 in the region of the reversing rollers 23, 24, the spindle 54 is guided in a slot 56 of the link 58. Between the spindle 54 and the stop 53 a tension spring 57 is provided which holds the body 256 in abutment on a bracket 58 which is secured to the open link chain 22 likewise at a distance from the attachment element 266. The bracket 58 has an angled-off stop 59 with which a plunger 60 of a venting valve 286 can be brought into engagement. The venting valve 286 has a valve disc 61 on the plunger which rests on an elastic seating ring 62 under the action of a compression spring 63 when the valve 286 is in the closed position. Parallel with the plunger 60 an air discharge channel 64 is provided in its bore. The suction cup 276 is arranged on the free end of the body 256 and secured by means of a hollow nipple 65 in a corresponding bore of the body 256. From the hollow nipple 65 a bore 66 leads to a space 67 which contains the spring 63 and in which the valve disc 61 is displaceable.

Figure 7:
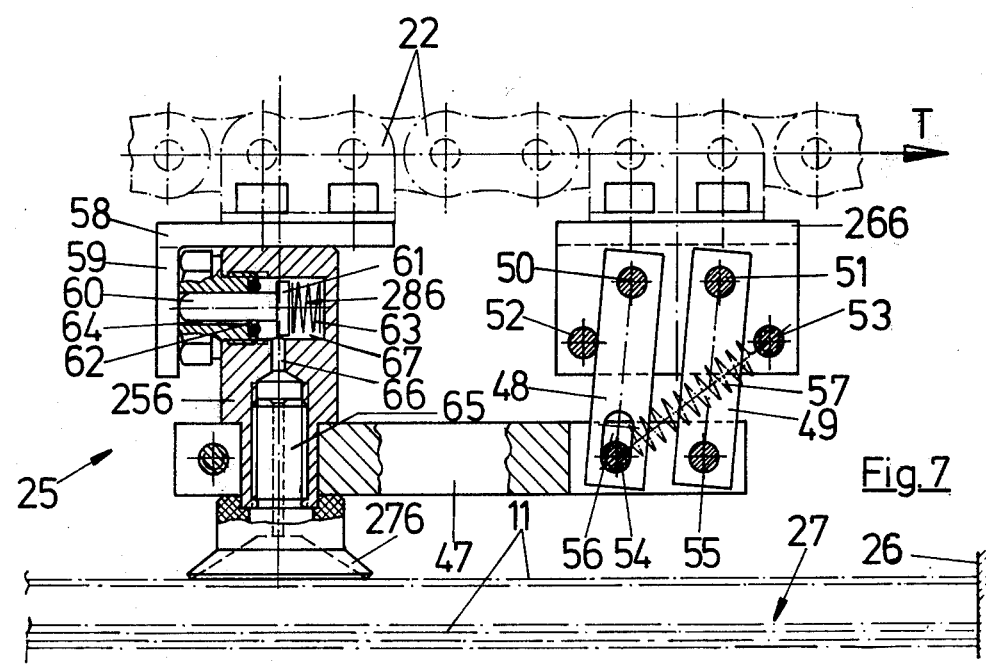
FIG. 7 shows the suction holder according to FIG. 6 in the depositing position.

If the metal panel 11 strikes according to FIG. 7 against the stop 26, the panel 11 comes to a halt while the open link chain 22 continues its movement in the transport direction T. Since the suction cup 276 also comes to a halt together with the metal panel 11, the body 256 is shifted together with the arm 47 contrarily to the transport direction T and the plunger 60 strikes against the stop 59. The valve disc 61 is lifted away from the seating ring 62 and the internal space of the suction cup 276 is vented through the hollow nipple 65, the bore 66, the space 67 and the channel 64. The panel 11 can then drop vertically downwards on to the stack 27. Then the panel 11 is oriented exactly in relation to the panels situated beneath it both in the transport direction T and transversely thereof. The complete stack 27 is then lifted away from the table 17 together with the pallet 19 or brought lying directly on the table 17 to another processing apparatus. The precisely orientated panels can then be lifted away conveniently, and damage in any way to the delicate surfaces of the panels is avoided.

What is claimed is:

1. An apparatus for transporting and depositing panels with smooth surfaces, comprising a conveyor having substantially horizontally oriented endless belt means, said belt means being guided over horizontal reversing rollers, a plurality of suction holding means carried by said belt means, each of said suction holding means having a body attached to said belt means and being provided with a suction cup being arranged at the free end of said body, some adjacent suction holding means being pressed against one of said surfaces of one of said panels to adhere firmly by suction thereto in the picking up of said panel, each of said suction holding means being further provided with a venting valve which is opened for depositing said panel at a depositing position, each of said suction cups being displaceable parallel with the transport direction in relation to the zone of attachment of its body to said belt means, and stop means being provided at said depositing position in the transport path of said panels, which stop means on arrival of one of said panels displaces all those adjacent suction cups holding said panel contrarily to said transport direction, which displacement opens the venting valves of all those adjacent individual suction holding means holding said panel.

2. An apparatus according to claim 1 wherein said belt means is formed as an endless strap and said bodies of said suction holding means are elastically deformable, said bodies being integrally formed on said strap.

3. An apparatus according to claim 1 wherein said belt means is formed as an endless strap and said bodies of said suction holding means are elastically deformable independent elements which are secured to said strap.

4. An apparatus according to claim 1 wherein said venting valve comprises an actuating journal secured to said suction cup and a stop secured to said body of said suction holding means, which stop in the depositing position pivots the actuating journal, so that air is admitted to the internal space of said suction cup.

5. An apparatus according to claim 1 wherein said body of said suction holding means is made substantially hollow cylindrical and has at the end opposite to said endless belt means a valve seating on which a valve disc rests under the action of a compression spring.

6. An apparatus according to claim 5 wherein a rigid pin is secured on said valve disc and in the region of said endless belt means an aperture is provided into which said pin extends.

7. An apparatus for transporting and depositing panels with smooth surfaces, comprising a conveyor having substantially horizontally oriented endless belt means, said belt means being guided over horizontal reversing rollers, a plurality of suction holding means carried by said belt means, each of said suction holding means having a rigid body attached to said belt means and being provided with a suction cup being arranged at the free end of said body, some adjacent suction holding means being pressed against one of said surfaces of one of said panels to adhere firmly by suction thereto in the picking up of said panel, each of said suction holding means being further provided with a venting valve which is opened for depositing said panel at a depositing position, each of said suction cups being displaceable parallel with the transport direction in relation to the zone of attachment of its body to said belt means, and stop means being provided at said depositing position in the transport path of said panels, which stop means on arrival of one of said panels displaces all those adjacent suction cups holding said panel contrarily to said transport direction, which displacement opens the venting valves of all those adjacent individual suction holding means holding said panel, said rigid body being tiltably mounted about a spindle on a bracket secured to said belt means, said venting valve being arranged on the side of said spindle pointing in the transport direction, a compression spring being arranged on the other side of said spindle, which spring holds the venting valve closed in the transport position.

8. An apparatus according to claim 7, wherein said bracket has a flat face as seating of the venting valve, against which a sealing O-ring is pressed by said compression spring in the transport position.

9. An apparatus for transporting and depositing panels with smooth surfaces, comprising a conveyor having substantially horizontally oriented endless belt means, said belt means being guided over horizontal reversing rollers, a plurality of suction holding means carried by said belt means, each of said suction holding means having a rigid body attached to said belt means and being provided with a suction cup being arranged at the free end of said body, some adjacent suction holding means being pressed against one of said surfaces of one of said panels to adhere firmly by suction thereto in the picking up of said panel, each of said suction holding means being further provided with a venting valve which is opened for depositing said panel at a depositing position, each of said suction cups being displaceable parallel with the transport direction in relation to the zone of attachment of its body to said belt means, and stop means being provided at said depositing position in the transport path of said panels, which stop means on arrival of one of said panels displaces all those adjacent suction cups holding said panel contrarily to said transport direction, which displacement opens the venting valves of all those adjacent individual suction holding means holding said panel, said rigid body being mounted displaceably parallel with said transport direction on an open link chain by means of a double link and bearing upon a bracket arranged on said open link chain at a distance from an attachment element under the action of a tension spring, which bracket comprises an angled-off stop for the actuation of said venting valve in said depositing position.

10. An apparatus according to claim 9 wherein said venting valve comprises a displaceable plunger arranged parallel with said transport direction and said open link chain, which plunger carries on its end opposite to said stop within a space a valve disc which is subject to the action of a compression spring which presses said valve disc against an elastic seating ring when said plunger is lifted away from said stop in said transport position.

11. An apparatus as claim in claim 1 wherein said stop means is displaceable in said transport direction.

* * * * *